United States Patent Office 2,970,083
Patented Jan. 31, 1961

2,970,083
TWO PHASE DEODORANT-ANTIPERSPIRANT STICK

Saul A. Bell, Nutley, N.J., assignor, by mesne assignments, to Chesebrough-Pond's, Inc., New York, N.Y., a corporation of New York No Drawing. Filed Mar. 6, 1958, Ser. No. 719,491

5 Claims. (Cl. 167—90)

My invention relates to a solid cologne type stick having deodorant and antiperspirant properties.

Modern solid colognes generally comprise solidified compositions of alcohol, soap and perfume oil with minor amounts of polyhydric alcohols and water and are designed to be applied to the surface of the skin by rubbing. They are usually in the shape of small, molded cylinders and are generally wrapped in foil and packaged in airtight containers. The solid colognes use as their gelling ingredient, a soap such as sodium stearate. The soap is incorporated as such into the liquid cologne mixture from which the solid stick is made or by forming it in the mixture by reacting stearic acid with sodium hydroxide solution.

It is important that the solid cologne have a large proportion of alcohol, for example, 80 to 90%, to give it such desirable characteristics as ease of application and cooling, refreshing and quick drying effects. While useable products can be prepared with a small amount of alcohol, such products are undesirable since they lack the above characteristics.

Solid colognes can also be given deodorizing properties by the addition of a soap-compatible skin antiseptic such as, for example, hexachlorophene, bithionol and 3,4,4-trichlorocarbanilide.

It is also desirable to impart antiperspirant properties to the solid cologne deodorant stick. Generally, astringent salts such as aluminum salts are added for this purpose. When such aluminum salts are added, however, usually an insoluble aluminum soap is formed and the product will not solidify into the desired gel form. This occurs whether the aluminum salt is acid or basic in reaction. Certain soap-compatible aluminum salts can be used to avoid this insoluble soap formation. Certain stable complex aluminum salts with alkaline reactions are compatible with the soap, i.e., they do not form insoluble aluminum soaps when added to an aqueous alcoholic solution of a soluble soap. An example of such a soap-compatible stable complex aluminum salt is sodium aluminum chlorhydroxy lactate complex which is commercially available and known as "Chloracel." In general, it is commercially available as a 40% aqueous solution.

In order to incorporate the soap-compatible, stable complex aluminum salt as an antiperspirant into a solid cologne having perfume and deodorant ingredients, however, the proportions of alcohol and aluminum complex solution must be maintained with in fairly narrow limits. For example, if 50 grams of a 40% w./w. aqueous solution of sodium aluminum chlorhydroxy lactate complex (equivalent to approximately 4.0 g. of $Al_2O_3$) is used, the optimum concentration of alcohol is 35 grams. If the amount of alcohol used is above 40 grams, there may be precipitation of the complex, and, on the other hand, if the amount of alcohol is reduced below 30 grams, a soft, mushy product will result. Hence, the alcohol content that can be employed with the soap-compatible, stable complex aluminum salt is considerably below that desired for and found in high quality modern solid colognes.

Moreover, antiperspirant cologne sticks containing soap-compatible, stable complex aluminum salts can become discolored after a few months due to the action of the complex aluminum salt on the perfume ingredients. Also such sticks cannot be wrapped in unprotected aluminum foil because of corrosive attack by the complex aluminum salt.

I have found that the above problems of providing antiperspirant properties in a solid cologne stick, namely, problems involving sufficient alcohol content, undesirable reactions and corrosion, are readily solved by providing an unperfumed antiperspirant cologne stick comprising soap-solidified alcohol and including the soap-compatible, complex aluminum salt, as a core, and surrounding the core with a larger deodorant cologne stick body comprising soap-solidified alcohol and including the deodorant skin antiseptic and perfume.

By using the unperfumed antiperspirant cologne stick as the core of a larger deodorant cologne stick, the proportions of soap-compatible complex aluminum salt, alcohol, soap, water and polyhydric alcohol can be adjusted for optimum stability, physical appearance and antiperspirant effect without regard to application properties because the application properties of the stick are essentially those of the cologne stick body and not of the antiperspirant core. Moreover, by perfuming only the deodorant cologne stick body and not the antiperspirant core, no deleterious reaction occurs between the complex aluminum salt and the sensitive perfume ingredients. Also, by incorporating the soap-compatible skin antiseptic in the cologne stick body and not in the antiperspirant core, any incompatibility between the complex aluminum salt and the deodorant ingredient are avoided. Also, the stick can be wrapped in aluminum foil without corrosion problems since the antiperspirant complex aluminum salt is isolated in the core.

The following example of preparation of an unperfumed antiperspirant core surrounded by a larger deodorant cologne stick body illustrates my invention.

The antiperspirant core was prepared as follows:

Part A—
|  | Gms. |
| --- | --- |
| 40% w./w. sodium aluminum chlorhydroxy lactate in water | 60.00 |
| Water | 6.00 |
| Alcohol (SDA Formula No. 40) | 22.00 |

Part B—
|  | Gms. |
| --- | --- |
| 70% sorbitol solution N.F. | 3.00 |
| Isopropyl myristate | 1.00 |
| Stearyl alcohol | 1.50 |
| Sodium stearate | 6.50 |

Part A was heated to 60° C. and Part B was then added and the mixture heated with agitation (without loss of alcohol) until clear. The mixture was poured at 60° C. into cylindrical molds of suitable size, i.e., ¾ inch in diameter. The material was removed from the molds when cool and solidified and one core was placed in the center of each cavity of a larger chilled cologne stick mold i.e., 1 7/16 inches in diameter.

The deodorant stick body was prepared as follows:

|  | Gms. |
| --- | --- |
| Alcohol (SDA No. 40) | 83.00 |
| Sodium stearate | 7.00 |
| Hexachlorophene | 0.50 |
| Water | 5.00 |
| Propylene glycol | 3.00 |
| Perfume compound | 1.50 |

All ingredients were heated together with agitation in a closed vessel fitted with a reflux condenser until clear. The mixture was poured at 65° to 70° C. into the chilled mold containing an antiperspirant core in each cavity. The material was removed from the molds when cool, wrapped in aluminum foil and packaged in air-tight containers. The resulting solid stick comprised the unperfumed antiperspirant core surrounded by the solid larger deodorant cologne stick body.

In the manufacture of the core, the method described whereby the aluminum salt is mixed with the alcohol and heated before adding the soap and polyols is particularly advantageous since it aids in the use of lesser amounts of alcohol and still provides a solid core of satisfactory characteristics.

The larger deodorant solid cologne stick body surrounding the unperfumed antiperspirant core generally comprises solidfied compositions of alcohol, soap, perfume, polyols and water. Generally, the proportions of a high quality cologne stick body are as follows in weight percent:

| | Percent |
|---|---|
| Alcohol, SD 39C or 40 | 80 to 90 |
| Solidifying ingredient (soap) | 6 to 8 |
| Perfume oil | 2 to 5 |
| Polyol | 0 to 5 |
| Water | 5 to 10 |

The polyol acts as a plasticizer to prevent the stick from becoming too brittle, to prevent the film from drying too rapidly on the skin during application, to prevent the deposition on the skin of a white powdery layer of soap and serves as a solvent for the gelation agent. Commonly used polyols are carbitol, propylene glycol, sorbitol, glycerol and polyethylene glycols. Fatty acid esters such as isopropyl palmitate or myristate can also be used. The deodorant skin antiseptic used with the solid cologne stick body generally is used in amounts of about 0.25 to 0.5%.

In the antiperspirant core comprising the antiperspirant soap-compatible complex aluminum salt and soap solidified alcohol the proportions in weight percent generally can comprise

| | Percent |
|---|---|
| Alcohol, SD 39C or 40 | 20 to 50 |
| Solidifying ingredient (soap) | 6 to 8 |
| Polyol | 0 to 5 |
| Water | 5 to 10 |
| Antiperspirant (as $Al_2O_3$) | 4 to 5 |

I claim:
1. A deodorant-antiperspirant stick comprising a solid antiperspirant core, said core comprising soap solidified alcohol and including a soap-compatible antiperspirant aluminum salt, and said core being surrounded by a solid deodorant stick body comprising soap-solidified alcohol and including a soap-compatible skin antiseptic deodorant and perfume.
2. The stick of claim 1 in which the soap-compatible aluminum salt of the antiperspirant core is sodium aluminum chlorhydroxy lactate complex.
3. The deodorant-antiperspirant stick of claim 1 wherein the amount of alcohol in said core is in the range of from about 20 to 50% by weight, and the amount of antiperspirant, as $Al_2O_3$, in said core is in the range of from about 4 to 5% by weight.
4. The deodorant-antiperspirant stick of claim 1 wherein the amount of alcohol in said stick body is in the range of from about 80 to 90% by weight.
5. The deodorant-antiperspirant stick of claim 1 wherein the amount of perfume in said stick body is in the range of from about 2 to 5% by weight.

References Cited in the file of this patent
UNITED STATES PATENTS

| 1,320,855 | Henderson | Nov. 4, 1919 |
| 2,566,722 | Friedberg | Sept. 4, 1951 |
| 2,732,327 | Teller | Jan. 24, 1956 |

OTHER REFERENCES

Kalish: D. and C. Ind., 79:3, September 1956, pp. 318–9 and 417.
Drug and Cos. Ind., 79:2, August 1956, p. 161.
Fishbach: Soap Perf. Cos., October 1954, pp. 1041–4.